United States Patent Office 3,462,492
Patented Aug. 19, 1969

3,462,492
CONDENSATION PRODUCTS OF PHENYLENE
DIAMINES AND ALKYLENE OXIDES
Ehrenfried H. Kober, Hamden, Conn., assignor to Olin
Mathieson Chemical Corporation, a corporation of
Virginia
No Drawing. Filed Apr. 5, 1965, Ser. No. 445,783
Int. Cl. C07c 93/14
U.S. Cl. 260—573         5 Claims

ABSTRACT OF THE DISCLOSURE

Oxyalkylated products particularly valuable for fire-resistant water base hydraulic fluids are prepared by the oxyalkylation of a phenylene diamine compound with a hydroxyalkylene oxide or with an alkylene oxide followed by a hydroxy alkylene oxide.

---

This invention relates to new chemical products and compounds which are useful as fire-resistant functional fluids and which are particularly valuable for fire-resistant water base hydraulic fluids. This invention is also concerned with the application of such chemical products and compounds in other arts and industries, as well as with methods of manufacturing the new chemical products and compounds.

More specifically, the present invention relates to products obtained by oxyalkylation of phenylene diamine compounds with hydroxyalkylene oxides or with alkylene oxides and hydroxyalkylene oxides. Although various oxyalkylated aromatic amines have been described, their usefulness as functional fluids is limited to certain applications since these known compounds possess a low degree of either water solubility or fire resistance. It has been found that products obtained by reacting a phenylene diamine compound with hydroxyalkylene oxides or with alkylene oxides and hydroxyalkylene oxides exhibit a high degree of fire-resistance and are soluble in water at 0° F. to 212° F. without undergoing phase separation. These properties make the products of this invention particularly useful as fire-resistant water base hydraulic fluids.

Moreover, the products obtained by condensing a phenylene diamine compound with hydroxyalkylene oxides or with alkylene oxides and hydroxyalkylene oxides have more than one hydroxy groups in the polyether chain or chains attached to the aromatic moieties and, therefore, can be employed as intermediates in the production of polyesters and polyurethanes.

The novel oxyalkylated products of the present invention are conveniently prepared by condensing a phenylene diamine compound with a hydroxyalkylene oxide or with an alkylene oxide and a hydroxyalkylene oxide in the presence of a catalyst and in the absence or presence of a solvent.

Phenylene diamine compounds useful as starting materials in this invention have the formula:

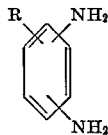

wherein R is selected from the group consisting of hydrogen, alkyl of from 1 to 5 carbon atoms, fluorine, chlorine and bromine.

Phenylene diamine compounds suitable as starting materials in the process of this invention include, for example, phenylene diamine, methyl phenylene diamine, ethyl phenylene diamine, isopropyl phenylene diamine, n-butyl phenylene diamine, isopentyl phenylene diamine, fluoro phenylene diamine, chloro phenylene diamine, bromo phenylene diamine, and mixtures and isomers thereof.

Useful alkylene oxides and hydroxyalkylene oxides are characterized by the generic structures:

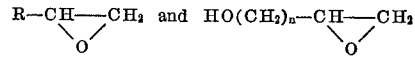

wherein R is hydrogen or an alkyl group of one to five carbon atoms and $n$ is an integer from 1 to 5 and include ethylene oxide, propylene oxide, butylene oxide, glycidol, 4-hydroxy butylene oxide, 6-hydroxyhexylene oxide etc. Materials, such as cyclohexylvinyl oxide, can also be used, if desired.

Suitable catalysts for reacting the phenylene diamines of this invention with alkylene oxides and hydroxyalkylene oxides are bases, such as alkali hydroxides, as exemplified by sodium hydroxide and potassium hydroxide; alkaline earth hydroxides such as calcium hydroxide, magnesium hydroxide, etc., and alkali alkoxides, such as sodium methoxide, potassium methoxide and sodium ethoxide.

Solvents in which the reaction leading to the products of this invention can be conducted include alkyl ethers of polyethylene glycols, such as diethyl ether of diethylene glycol, dimethyl ether of diethylene glycol, dibutyl ether of diethylene glycol and dimethyl ether of triethylene glycol and aromatic hydrocarbons, such as toluene and xylene. The reaction, however, can also be carried out in the absence of a solvent.

In one embodiment, the process for preparing the products of this invention comprises the addition of the alkylene oxide to the starting phenylene diamine compound in the presence of a catalyst, followed by reaction with a hydroxyalkylene oxide used as capping agent. This particular embodiment is referred to as the two-stage process. In a second embodiment of this invention, useful products are prepared by reacting a phenylene diamine compound in the presence of a catalyst with a hydroxyalkylene oxide. This second embodiment is referred to in this specification as the single-stage process.

Although useful products can be prepared by reacting a mixture of an alkylene oxide and a hydroxyalkylene oxide with the phenylene diamine compound thus forming random addition products, it is preferred, however, to add the alkylene oxide first and then to react the intermediate thus obtained with the hydroxyalkylene oxide. This avoids excessive branching in the polyether chains and provides for more linear products which have better viscosity-temperature properties than the products obtained when the addition of the alkylene oxide and hydroxyalklene oxides is reversed or when they are added at random.

The amount of catalyst utilized will be from about 0.1 to about 5 percent and preferably, will range from about 1.0 and about 3.0 percent based on the amount of phenylene diamine compound employed in the reaction.

The overall reaction temperature in both the single and two two-stage reaction will generally range from about 90° C. to about 200° C. and preferably will be between 100 and 180° C. at atmospheric pressure but slightly higher or lower pressures can also be used. If a solvent is employed, the products of the reaction are recovered by stripping the solvent in vacuo at temperatures up to 250° C. or by an other convenient method.

In the two-stage method, and number of moles of alkylene oxide used can be varied widely and generally will be from about 1 to about 6 moles for each reactive hydrogen atom of the phenylene diamine charged to the reactor and, in a like manner, from about 1 mole to about 6 moles of hydroxyalkylene oxide per reactive hydrogen of starting phenylene diamine is usually employed. In the single-stage method from about 1 to about 8 moles of hydroxyalkylene oxide are generally reacted per reactive hydrogen of the starting phenylene diamine compound. The reactive hydrogen atoms of the phenylene diamine compounds are the hydrogen atoms of the —NH$_2$ groups of the said compounds. With the two-stage reaction products of this invention, the first product formed by condensing a phenylene diamine with an alkylene oxide is a hydroxyl-terminated polyoxyalkylene intermediate. The hydrogen atoms of the hydroxyl groups of the intermediate are, likewise, reactive hydrogen atoms which form the point of reaction, when in the second stage, the intermediate is further condensed with a hydroxyalkylene oxide to form the final product. In preparing the novel products of this invention, mixtures of the alkylene oxides as well as the hydroxyalkylene oxides can be utilized, if desired.

The products of this invention are mixtures rather than pure compounds. As is well understood in the field of alkylene oxide chemistry when a compound having a reactive hydrogen, such as a phenylene diamine derivative is oxyalkylated or reacted with alkylene oxide, the product resulting is a mixed product consisting of closely related homologs in which the statistical average number of oxyalkylene groups is equal to the number of moles of alkylene oxide reacted and the individual members in the mixture have varying numbers of oxyalkylene groups.

The products obtained by oxyalkylation of phenylene diamines according to this invention, are useful for many fluid applications. The fluid base stocks, which are water soluble, have autogeneous ignition temperatures in excess of 800° F., flash points and fire points above 500° F., are compatible with seawater, and possess high shear stability. For use as water base hydraulic fluids, the viscosity of these base stocks can be adjusted to desirable levels by addition of water. Viscosity index improvers and pour point depressants can also be added without detrimentally affecting the water solubility and fire resistance. These fluids can be further adjusted by addition of corrosion inhibitors, pH buffers, antiwear agents and antifoam agents. Since the products obtained by oxyalkylation of phenylene diamines according to this invention are characterized by a high hydroxyl number (indicating a high content of free hydroxy groups) these materials are especially valuable as intermediates in the production of urethanes.

The following examples, which serve to illustrate this invention, are to be considered not limitative.

Example I

A 250 ml. three neck flask, equipped with thermometer, stirrer, addition funnel, and condenser with drying tube, was charged with 40 g. (0.328 mole) of 2,4-toluylenediamine and 0.6 g. (1.5 percent) of powdered potassium hydroxide. An amount of 97.4 g. (1.316 moles) of glycidol (mole ratio of toluylene diamine to glycidol=1:4) was added dropwise to the stirred mixture which was preheated to 105° C. The temperature of the reaction mixture was controlled between 105-120° C. by adjusting the addition rate. Once the reaction had started, an external heating source was no longer required. After complete addition, heating at 105° C. was continued for an additional hour.

The crude product was freed from low boiling components by heating at 225° C. under a vacuum of 1 mm. Hg to yield 135.8 g. (98.3 percent) of a dark, tan-colored liquid which had a hydroxyl number of 1015. Based on the calculated theoretical average molecular weight of 418, there were an average of 7.6 free hydroxyl groups per molecule of product. The autogeneous ignition temperature of the product was found to be 875° F., the flash point above 550° F. and the flame point above 550° F. The product was completely miscible with water over the temperature range of from 0° to 210° F. A 70 percent solution in water had a pour point of —20° F., a viscosity of 25.9 cs. at 150° F. and a viscosity of 1458 cs. at 25° F.

Example II

The experiment described in Example I was repeated, except that it was carried out in a 500 ml. three-neck flask equipped as described in Example I and that 194.8 g. of glycidol and 40 g. of 2,4-toluylene diamine were employed (mole ratio of toluylene diamine to glycidol of 1:8). The product, after being heated in vacuo as described in Example I, had a hydroxyl number of 902. The average number of free hydroxyl groups per molecule was 11.5, based on the calculated theoretical average molecular weight of 714. The autogeneous ignition temperature of the product was found to be 800° F. and it was completely miscible with water over the temperature range of from 0 to 210° F. A 66 percent solution in water had a pour point of —15° F., a viscosity of 29.0 cs. at 150° F. and of 1928 cs. at 25° F.

Example III

The experiment described in Example I was repeated except that it was carried out in a 1000 ml. three-neck flask equipped as described in Example I and that 584.4 g. of glycidol and 40 g. of 2,4-toluylene diamine were employed (mole ratio of toluylene diamine to glycidol of 1:24). The product, after being heated in vacuo as described in Example I, had a hydroxyl number of 826. Based on the calculated theoretical average weight of 1886, it was determined that the product had an average of 28 free hydroxyl groups per molecule. The product, which had an autogeneous ignition temperature of 850° F., was found to be completely soluble in water over the temperature range of from 0 to 210° F. A 63 percent solution in water had a pour point of —20° F., a viscosity of 27.0 cs. at 150° F. and a viscosity of 1396 cs. at 25° F.

Example IV

A 500 ml. three-neck flask, equipped with stirrer, drying tube, thermometer, jacketed addition funnel, and ice-water condenser on top, was charged with 40.0 g. (0.328 mole) of 2,4-toluylene diamine and 1.2 g. (3.0 percent) by weight based on 2,4-toluylene diamine of powdered potassium hydroxide. The mixture was then heated to 150° C.; stirring was started when the toluylene diamine had completely melted. A total of 116 g. of ethylene oxide (mole ratio toluylene diamine to ethylene oxide—1:8) was added dropwise starting at 150° C. and at such a rate that the temperature of the reaction mixture was maintained at between 150 and 160° C. After the refluxing and condensation of ethylene oxide had ceased, the flask was cooled to a temperature of 130° C. and 97.4 g. of glycidol (mole ratio of toluylene diamine to glycidol=1:4) was added in a dropwise manner and at such a rate that the pot temperature remained under 150° C. After the addition of the glycidol had been completed, the reaction mixture was maintained at 130° C. for an additional hour. Low boiling components were then removed from the resulting product by heating to 225° C. under a vacuum of 0.1 mm. Hg. A total of 241 g. of product was obtained, corresponding to a 95 percent yield. The hydroxyl number was determined and found to be 559. Based on the calculated theoretical average molecular weight of 583, there were an average of 7.65 free hydroxy groups per molecule of product. The autogeneous ignition temperature of the product was found to be 875° F., the flash point 500° F. and the flame point 550° F. The product was completely miscible with water over a temperature range of from 0 to 210° F. A 71 percent solution in water had a pour point of —20° F., a viscosity of 27.8 cs. of 150° F. and a viscosity of 2499 cs. at 250 F.

Example V

The experiment described in Example IV was repeated, except that a mixture of 29 g. of ethylene oxide and 38.2 g. of propylene oxide were first reacted with 40 g. of toluylene diamine. After refluxing and condensation of the ethylene oxide and propylene oxide had ceased, 97.4 g. of glycidol was added. The low boiling components were removed from the resulting product by heating to 225° C. under a vacuum of 0.1 mm. Hg. A total of 199 g. of product was obtained, which corresponds to 97.5 percent of the theoretical yield, which had a hydroxyl number of 590. The average number of free hydroxyl groups per molecule of product was 7.6, based on the calculated theoretical average molecular weight of 624. The autogenous ignition temperature of the product was found to be 850° F., the flash point 585° F. and the flame point 590° F. Over the temperature range of from 0 to 210° F., the product was completely miscible with water. A 69 percent solution in water had a pour point of −20° F., a viscosity of 25.6 cs. at 150° F. and a viscosity of 12,078 cs. at 25° F.

What is claimed is:

1. A polyoxyalkylated fluid product completely miscible with water prepared by condensing (A) glycidol with a polyamine of the formula:

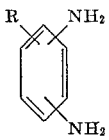

wherein R is selected from the group consisting of hydrogen, methyl, fluorine, chlorine and bromine; the amount of the said glycidol used being from about 1 mole to about 8 moles per reactive hydrogen atom of the said polyamine.

2. The product of claim 1 wherein the said polyamine is 2,4-toluylene diamine.

3. A polyoxyalkylated fluid product completely miscible with water prepared by condensing (A) an alkylene oxide of the formula:

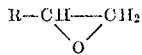

wherein R is selected from the group consisting of alkyl of from 1 to 5 carbon atoms and hydrogen, with a polyamine of the formula:

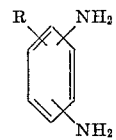

wherein R is selected from the group consisting of hydrogen, methyl, fluorine, chlorine and bromine to form a polyoxyalkylene intermediate product and subsequently condensing the polyoxyalkylene intermediate product with glycidol; the amount of said alkylene oxide used being from about 1 mole to about 6 moles per reactive hydrogen atom in the said polyamine and the amount of the said glycidol used being from about 1 mole to about 6 moles per reactive hydrogen atom of the said polyamine.

4. The product of claim 3 wherein the said alkylene oxide is ethylene oxide, and the said polyamine is 2,4-toluylene diamine.

5. The product of claim 3 wherein the said alkylene oxide is a mixture of ethylene oxide and propylene oxide and the said polyamine is 2,4-toluylene diamine.

References Cited

UNITED STATES PATENTS

| | | | |
|---|---|---|---|
| 2,161,322 | 6/1939 | Steindorff et al. | 260—563 |
| 3,354,209 | 11/1967 | Brack | 260—573 |

CHARLES B. PARKER, Primary Examiner

P. C. IVES, Assistant Examiner

U.S. Cl. X.R.

252—8.1; 260—574